United States Patent Office.

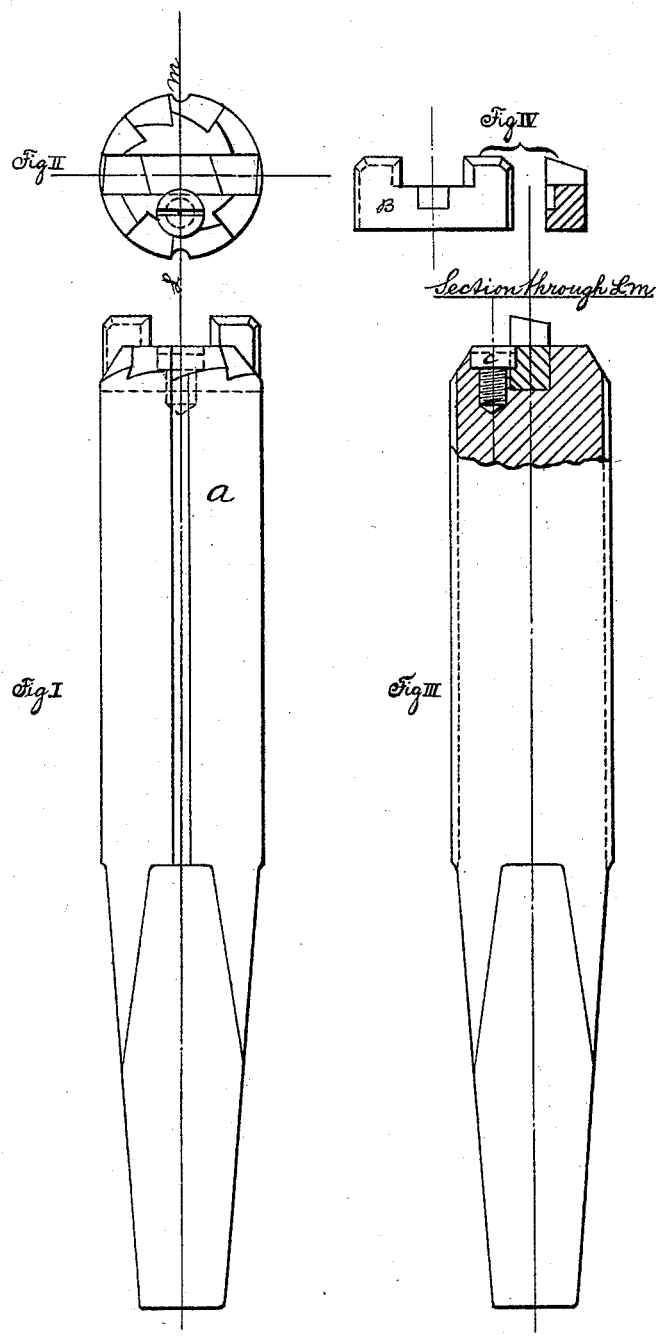

JOHN SHIELDS, OF JERSEY CITY, NEW JERSEY.

BORING-TOOL.

SPECIFICATION forming part of Letters Patent No. 395,459, dated January 1, 1889.

Application filed June 19, 1888. Serial No. 277,600½. (No model.)

*To all whom it may concern:*

Be it known that I, JOHN SHIELDS, a citizen of the United States, residing in Jersey City, in the county of Hudson, and in the State of New Jersey, have invented certain new and useful Improvements in Boring-Tools, commonly called the "Rose-Bit;" and I hereby declare that the following is a full, clear, and exact description of the invention, reference being had to the accompanying drawings, making a part of this specification, in which—

Figures I and III are side views of the same, showing the cutter in the end of the bar or rose-bit. Fig. II is an end view with the cutter in its place. Fig. IV is two views of the cutter without the rose-bit.

The design of my invention is to enable a workman to get a perfect and standard hole which can be easily and accurately adjusted.

The old rose-bit is a steel bar with teeth in the end. Now my invention is a slot cut in the end of that bar or rose-bit, in which I place a cutter that is somewhat smaller than the rose-bit, which will relieve the rose-bit by cutting in advance from all the heavy boring and leaving only a small portion for the rose-bit to do, so that you always can get a perfect hole and to a standard size. By making all the bits to the standard you will always have a gage for all size holes. My object in making this cutter in advance of the rose-bit is for the purpose of doing more and better work than ever has been done before, so that it will be a standard tool for all kinds of work.

In the annexed drawings, A represents a metal bar made from steel with teeth cut in the end; also, a slot is cut in the end of its center, so as to allow a cutter to be put in diametrically across the center of the bar, which is the advance cutter.

B is the cutter with two cutting-points.

C is the screw that holds the cutter in place.

I will now give some explanation in regard to my invention. In order to bore a pulley or anything else with cored holes, set your work true in the lathe and take an ordinary lathe boring-tool for boring and bore the hole large enough to admit the cutter and deep enough to allow the body of the rose-bit to enter about half an inch. To drill solid work in a drilling or boring machine, I take a twist-drill or an ordinary drill and drill a hole large enough to allow the borings to pass through, not to choke up the advance cutter. By this operation I can bore any pulley or anything else that wants to be bored out, and all done in one cut, which cannot be done at the present time with the old-style rose-bit.

The cutter is made to cut on both sides of the hole, guided by the body of the rose-bit. There will be no danger of breaking the cutter, and at the same time the rose-bit is doing its own work by finishing the hole after the cutter.

If the cutter should happen to break, all that will have to be done is to take out the screw that holds it in place. The cutter can then be replaced and you will still have your standard size with the rose-bit, which will always remain the same.

Now, having given all the explanation of my device, both in construction and working of the same, so that any one in any machine-shop can make my invention, what I claim, and desire to secure by Letters Patent of the United States, is—

1. The cross-cutter, or cutter called the "advance cutter," in combination with the rose-bit, for the purpose herein described in this specificaton.

2. The cross-cutter B in connection with the screw C, in combination with the rose-bit A.

JOHN SHIELDS.

Witnesses:
JOHN N. BRUNS,
J. W. MCDONALD.